United States Patent [19]
Doisy et al.

[11] Patent Number: 5,428,581
[45] Date of Patent: Jun. 27, 1995

[54] METHOD FOR COMPENSATING FOR THE MOVEMENT OF THE ANTENNA FOR A SONAR

[75] Inventors: Yves Doisy, Grasse Plascassier; Jean-Pierre Baudoux, Antibes; Guy Le Parquier, Versailles, all of France

[73] Assignee: Thomson - CSF, Puteaux, France

[21] Appl. No.: 133,010

[22] PCT Filed: Mar. 27, 1992

[86] PCT No.: PCT/FR92/00279
  § 371 Date: May 18, 1994
  § 102(e) Date: May 18, 1994

[87] PCT Pub. No.: WO92/18878
  PCT Pub. Date: Oct. 29, 1992

[30] Foreign Application Priority Data
  Apr. 16, 1991 [FR] France .................. 91 04626

[51] Int. Cl.⁶ ............................................. G01S 15/50
[52] U.S. Cl. ............................................. 367/88; 367/904
[58] Field of Search ............................ 367/88, 12, 105, 7, 367/904

[56] References Cited
U.S. PATENT DOCUMENTS

| | | |
|---|---|---|
| 4,987,563 | 1/1991 | Gilmour ..................... 367/88 |
| 5,101,383 | 3/1992 | Doisy et al. ............... 367/103 |

FOREIGN PATENT DOCUMENTS

| | | |
|---|---|---|
| 0028895 | 5/1981 | European Pat. Off. . |
| 1486068 | 9/1977 | United Kingdom . |
| 2184236 | 6/1987 | United Kingdom . |

*Primary Examiner*—Daniel T. Pihulic
*Attorney, Agent, or Firm*—Oblon, Spivak, McClelland, Maier & Neustadt

[57] ABSTRACT

The invention relates to towed sonars. It consists in compensating electronically for the movement of the antenna in order to suppress the Doppler shift of the fixed echoes. In order to do that in a towed linear antenna (203) comprising N sensors (205), M (M<N) successive sensors are selected which are switched electronically in order to make them travel synthetically over the antenna in the direction opposite to the movement of the latter at a speed equal to twice the forward speed of the antenna. In order not to have too large a number of physical sensors, the signals from the latter are interpolated in order to obtain synthetic sensors which are sufficient in number to reduce the increment of the movement of the synthetic sub-antenna in such a way as to suppress the parasitic lobes due to the incremental nature of this movement. It makes it possible to increase the sensitivity of sonars without increasing their power. FIG. 2.

5 Claims, 3 Drawing Sheets

METHOD FOR COMPENSATING FOR THE MOVEMENT OF THE ANTENNA FOR A SONAR

The present invention relates to methods which make it possible to compensate, in sonars, for the movements of the antenna which risk disturbing the reception of the acoustic signals.

It is known, in order to detect a moving target with a sonar, to use the Doppler effect by sending out an acoustic pulse whose frequency band is smaller than the Doppler shift likely to affect the echoes originating from moving targets. On reception, the received signals are correlated with several copies of the signals sent out, each copy corresponding to a different Doppler shift. The type of correlation obtained with the copy which corresponds to a Doppler shift identical or substantially identical to that of the target makes it possible to locate this target in distance, as well as to determine its radial speed with respect to the sonar. This method is entirely compatible with the other signal processing systems, in particular those which consist in forming directional receiving channels. This method makes it possible to improve the contrast between the useful echo which is affected by a Doppler shift and the other echoes originating from the reverberation as much from the bottom and from the surface of the sea, as from the volume itself of the underwater medium whose non-uniformities give rise to a diffuse ambient echo which is very troublesome for a simple sonar. In fact, the echoes due to reverberation are not affected by a Doppler shift since the elements at the origin of this reverberation do not move, which makes it possible to eliminate them. This assumes that the target is moving, which is generally the case.

Very often the sonar is carried, or towed, by a boat which is moving at a speed which is not negligible with respect to that of the target. In this case the echoes due to reverberation are affected by a Doppler shift originating from the speed of the sonar itself. As transmission in general covers a wide angular sector, there are always reverberation sources whose radial speed with respect to the sonar is substantially equal to that of the moving target. In these conditions the echo/noise contrast is appreciably limited by these reverberation sources, even if these sources are outside the main lobe of the receiving channel used since, as is known, there are always relatively significant secondary lobes in the diagram of such a channel.

In order not to be too much disturbed by such an effect, it would be necessary for the target to move at a speed at least higher than twice the speed of the vessel which is carrying the sonar. This would lead to very seriously limiting the speed of the vessel and thus its operational capabilities. If, moreover, the target is a torpedo which is heading towards the boat, it is easy to imagine the catastrophic consequences of such a speed reduction on the capability of escaping this very torpedo.

In order to overcome the problems related to movements of the sonar, the invention proposes a method of compensating for the movement of the antenna for a sonar, in which the antenna comprises a set of transducers and is driven in a translational movement, characterized principally in that the signals from these transducers are switched in order to obtain a synthetic movement of the antenna making it possible to compensate for the Doppler shift applied to the fixed echoes by the said translational movement.

Other features and advantages of the invention will appear clearly in the following description, given by way of non-limiting example with regard to the attached figures which represent:

BRIEF DESCRIPTION OF THE DRAWINGS

In FIG. 1, a sonar 101, carried by a boat moving with a speed $V_A$ receives the echo from a target 102 situated at an azimuth $\Theta$ corresponding to the main lobe of a receiving channel 104.

Figure 1:
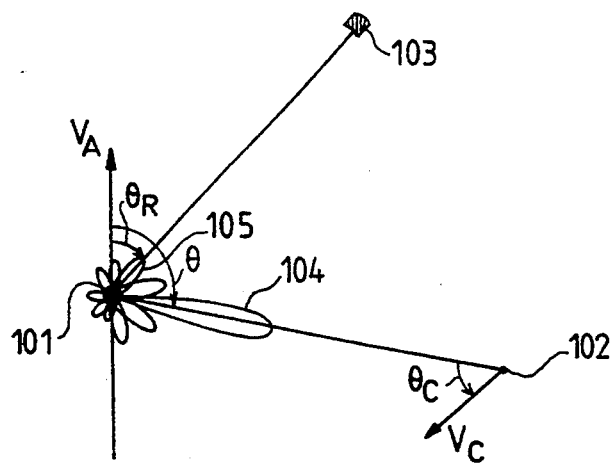
FIG. 1, a diagram of reception from a target and from a reverberation cell.

This target is moving with a speed $V_c$ forming an angle $\Theta_c$ with respect to the axis of the receiving channel 104. The sonar further receives echoes from various places in the sea forming reverberation cells. One of the latter, 103 for example, lies at an azimuth $\Theta_R$ with respect to $V_A$, this azimuth corresponding to a secondary lobe 105 of the main receiving channel 104.

Starting from the known formula giving the Doppler shift which is equal:

$$\frac{2 V_r}{c} f_0 \qquad (1)$$

in which $V_r$ is the radial speed between the target and the sonar, c the speed of sound in water, and $f_0$ the transmission frequency of the sonar, the Doppler shift will be the same for the target and the reverberation cell 103 when the parameters of these two echo sources satisfy the following equation:

$$(2) \quad V_A \cos \Theta_r = V_c \cos \Theta_c + V_A \cos \Theta \qquad (2)$$

As the reverberation cells are situated throughout the space surrounding the sonar, particularly those originating from volume reverberation, this equality has every chance of being satisfied in one or more directions corresponding to secondary receiving lobes of the sonar. Even if these lobes are relatively attenuated with respect to the main lobe, the result is finally heavily disturbed.

Figure 2:
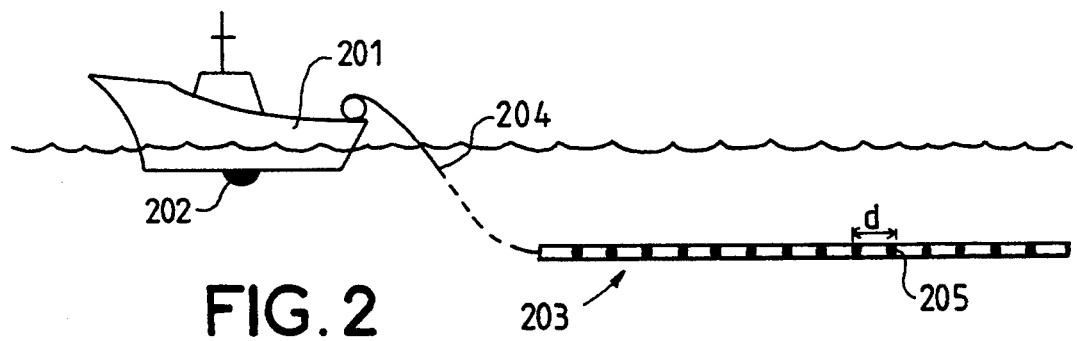
FIG. 2, a boat towing a sonar antenna.

In FIG. 2 is represented a towing vessel 201 which includes, under its hull, a sonar transmitter 202 which radiates, in a substantially omnidirectional way, throughout the undersea space. The vessel is towing, with the aid of a towing cable 204, a linear sonar antenna 203 formed by a set of sensors 205 regularly spaced by a distance d along the antenna.

As explained above, the vessel is advancing in a direction substantially parallel to its axis with a speed $V_A$. It carries along the transmitter 202 and the receiving antenna 203, needless to say. In these conditions the echoes received by the antenna 203 originating from pulses of duration T sent out by the transmitter 202, exhibit a Doppler shift even when they originate from reverberation on fixed obstacles, whose value corresponds to a relative speed 2 $V_A$. The coefficient 2 stems from the fact that the transmitter and the receiver are both advancing at the speed $V_A$.

In order to eliminate this Doppler shift, and the drawbacks which it exhibits, it would be necessary for the receiving antenna to move in the direction opposite to the movement of the boat with a speed $V_A$. This is manifestly not possible since, even if the towing cable is left to pay out freely, the antenna would remain at best immobile in the sea and there would thus be a Doppler shift corresponding to a speed $V_A$ due to the movement of the transmitter. In order to obtain complete compensation, the invention proposes to select at least one set of M consecutive sensors among the N sensors constituting the antenna and to move this set electronically along the antenna 203 towards the rear of the latter at a speed equal to 2 $V_A$ with respect to the antenna. Hence this set of N sensors is moving with respect to the marine medium at a speed $V_A$ directed in the opposite sense to the forward movement of the boat, which makes it possible to compensate completely for the Doppler shift introduced on the fixed echoes by the movement of the boat and of the receiving antenna. Everything happens as if the sensors of the receiving antenna were placed on a belt moving at a speed $-2\ V_A$ with respect to the receiving antenna. When the synthetic movement of this set of M sensors has brought the sliding sub-antenna to the rear extremity of the physical antenna, it departs again to the front extremity of the latter, which is done instantaneously since simple electronic switching is involved.

The processing of the signal consists, as was seen above, in addition to the formation of channels, in correlating the signals received with a copy of the signal sent out. This signal being a pulse of duration T, correlation makes it necessary to use a signal received during this same duration T. As the M sensors are moving synthetically along the antenna it is therefore necessary for the sub-antenna thus selected to be sufficiently small in order not to overshoot the rear extremity of the antenna before the end of the duration T. This imposes a maximum value on M as a function of T, which is given by the relationship:

$$(3)\quad Nd \geq Md + 2\ V_A T \quad (3)$$

Needless to say it will be beneficial to arrange for this inequality to be an equality so as to have a maximum number of sensors used in order to obtain the best received signal. This case is represented in the diagram of FIG. 2 in which a first subassembly is seen to depart from the start of the physical antenna to arrive at the end of the latter at the expiry of a time T. This movement is represented by the shaded surface 301.

When this first subantenna has arrived at the end, it therefore departs again to the start along the dotted line 311.

Figure 3:
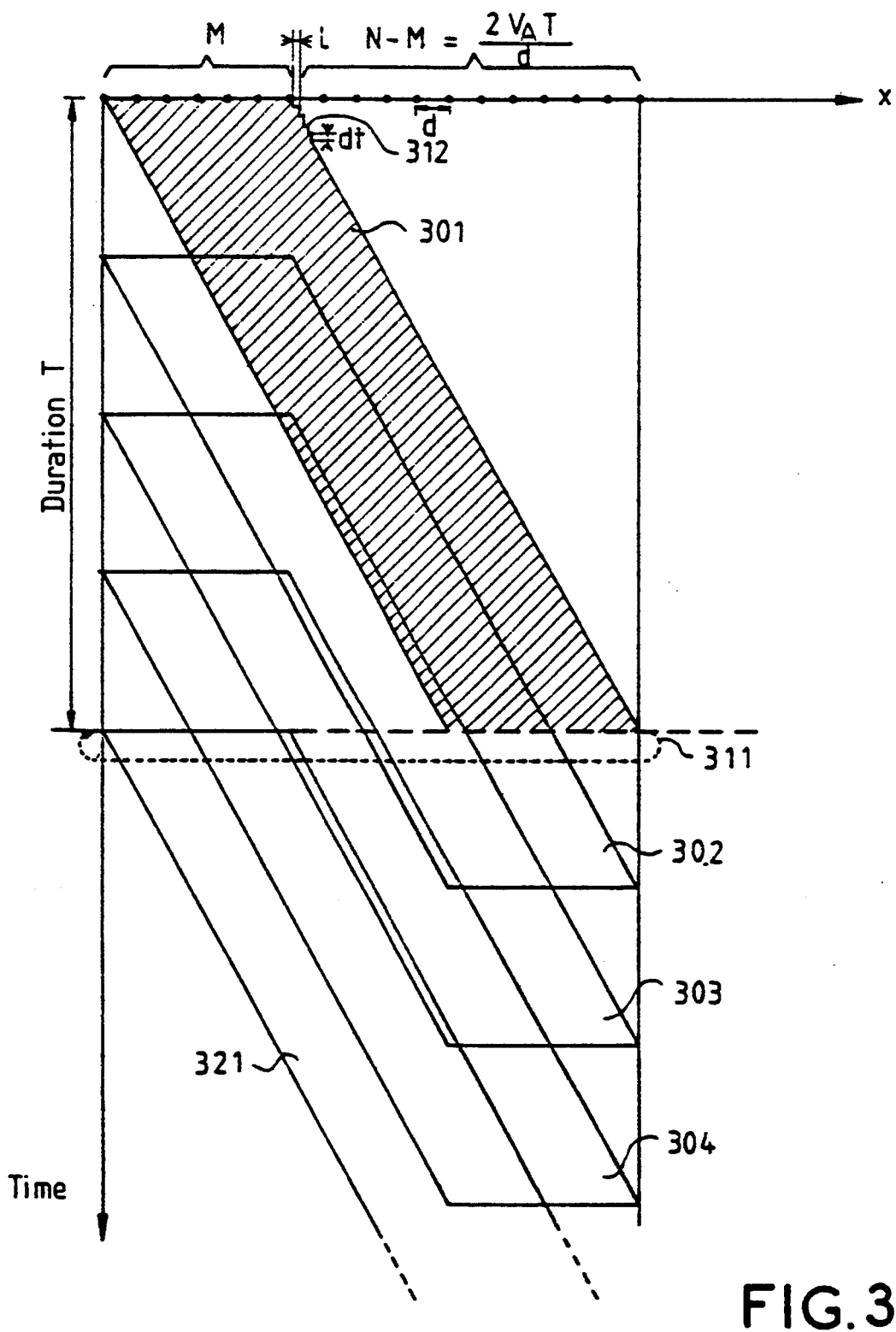
FIG. 3, the constructional diagram of the virtual antennae of a sonar according to the invention.

This processing will, needless to say, give output signals every T seconds, which correspond to echoes distributed in time every 2 $V_A T$ meters, which leaves observation holes in the undersea space. The problem is identical when this sliding antenna system according to the invention is not used. In the usual practice, successive identical processings, staggered over the duration T, are carried out on the set of sensors of the antenna. According to the invention the same practice will be used, but by selecting several sliding subantennae which will depart from the start of the antenna at regularly staggered instants during this duration T. The number of subantennae thus selected will essentially be a function of the processing capacity of the computer system which is carrying out all these calculations, with regard to the coverage which it is desired to obtain, having regard to the fact that an echo is not a point source. As there is no necessity to have a strictly continuous coverage, in practice an overlap of 75% is often sufficient and then corresponds to four subantennae 301 to 304 which depart one after the other from the start of the physical antenna during the duration T. At the expiry of the duration T, the antenna 301 again departs from the start of the antenna as represented by reference numeral 321 in FIG. 3. Put another way, that means that, generally, the instant of arrival of a pulse on the antenna does not coincide with the instant at which the subantenna is found at the start of the antenna. Hence it is necessary to process several subantennae during the duration T.

It has been assumed implicitly up to now that in order to obtain this compensation for the movement it was possible at any instant to select the correct sensors at the correct places to constitute a subantenna moving with the correct speed. As the processing is carried out digitally, as is now usual, on signal samples picked up on the sensors, a discrete number of sensors distributed along the antenna will be satisfactory. Nevertheless, as the sampling is sufficiently rapid to take account, on the one hand, of the Nyquist criterion, and, on the other hand, of certain limitations which will be seen later in the text, and as, moreover, it is necessary to anticipate that the speed of the boat may be variable, the subantenna is made to undergo a-synthetic movement formed by a series of rearward jumps by a distance 1 every dt seconds. This movement is partially represented by the crenellated part 312 in FIG. 3. Having regard to the orders of magnitudes currently used, it is difficult, as is seen on the figure, to have a sufficient number of sensors to select those situated at the correct places.

This leads to an interpolation therefore being effected against several successive sensors in order to obtain the signal corresponding to an intermediate sensor situated at the appropriate place. This is a current technique in the state of the art and presents no difficulty.

In these conditions, and as the real sensors are undergoing a continuous physical movement, the signals originating from a target situated at an azimuth Θ and under way at a speed the projection of which on the direction e is equal to $V_c$, will have a phase, if $f_0$ is the central frequency of the pulse sent out and c the speed of sound in the marine medium, which will depend on time according to the formula:

$$o = 2\pi \left(1 + \frac{2V_c}{c}\right) f_0 t + \phi(t) \quad (4)$$

Figure 4:
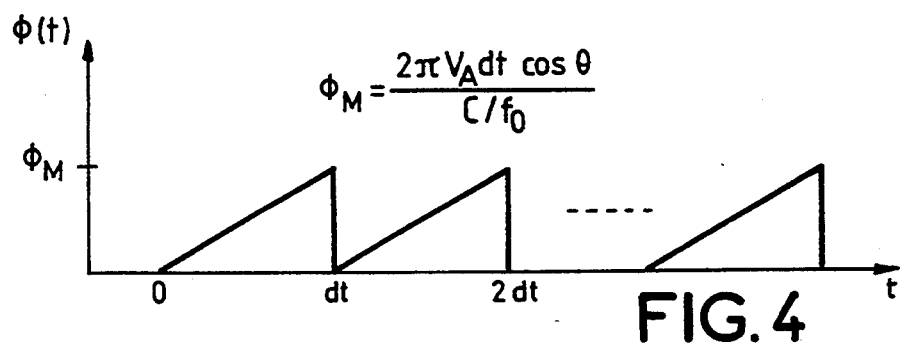
FIG. 4, the variation of phase over time of the reception signal.

The corrector term $\phi(t)$, the variation in which is represented in FIG. 4, stems precisely from the incremental character of the compensation for the movement of the antenna.

Figure 5:
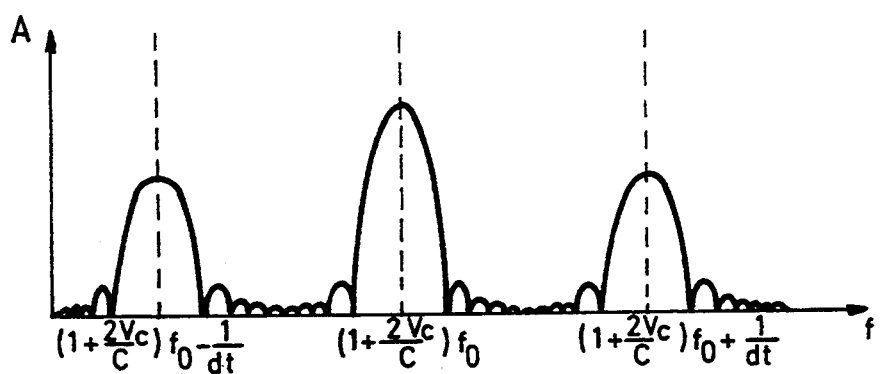
FIG. 5, the spectrum of this signal.

The spectrum of the received signal, which is represented qualitatively in FIG. 5, therefore comprises image lobes whose amplitude is given by the formula:

$$(5)\quad A = \sin(\pi\ 1.\cos\Theta.of/c)/[\pi.(1+1.\cos\Theta.of/c)]$$

and whose position is given by the formula:

$$f = (1 + 2\ Vc/c)fo \pm \frac{1}{dt} \quad (6)$$

These lobes are therefore spaced every 1/dt, as will easily be noted in FIG. 5. FIG. 5, needless to say, represents only the main lobe and the two secondary lobes which are of the most significant order.

It is therefore appropriate, in order not to spoil the beneficial results of the invention by disturbances contributed by these image lobes, to eliminate their influence. When the influence of the lobes of order +1 and −1 has been eliminated, the influence of the lobes of higher order will automatically have been eliminated.

This elimination is done by the choice of 1 according to one of the two following criteria, taking the least stringent:

The amplitude of the lobes can be reduced so that they are lower than the desired spectral level Ns for these lobes, which dictates that 1 satisfies the relationship:

(7) 20 log (sin $\pi$(1. cos $\Theta$.of/c)/$\pi$(1+1. cos $\Theta$of/c)$\geq$Ns    (7)

For a currently sought value for Ns of −40 dB, 1 must then be less than 1/100th of the transmission wavelength in the case in which cos $\Theta$=1, which is a small and stringent value.

The other way of eliminating the influence of the image lobe is to choose 1 so that the position of this image lobe falls outside the receiving band Br of the sonar, which, since 1/dt must be greater than or equal to Br, leads to the following relationship being satisfied:

(8). $1 \leq 2V_A/Br$    (8)

For example, taking a sonar operating at $f_0$=3000 Hz for detecting targets moving at a maximum speed of 30 m/s, corresponding to a band Br equal to 240 Hz for a speed of sound in water of 1500 m/s, and for a speed of the boat $V_A$=10 m/s, a maximum value for 1 is obtained equal to 1/6th of the wavelength. It is noted that this value is much less of a constraint than the preceding one. In the majority of cases this will therefore be the criterion which will be chosen.

As it is current practice in the state of the art to place the sensors with a spacing equal to ½ wavelength, it can thus be seen that more often than not the interpolation described above will have to be carried out. This interpolation is done in a known way from $nM_i$ sensors which are closest to the virtual sensor whose position has to be interpolated. This number $M_i$ depends (in a known way) essentially on the pitch d of the physical sensors and of the angular sector for reception, so as to have a sufficient number of samples to interpolate validly. The relationship (3) for the number of physical sensors to be used then becomes the relationship:

(9) $Nd \geq Md + 2V_AT + M_id$    (9)

Having regard to the orders of magnitudes used, nothing much changes, since $M_i$ is markedly lower than M in practice.

Figure 6:
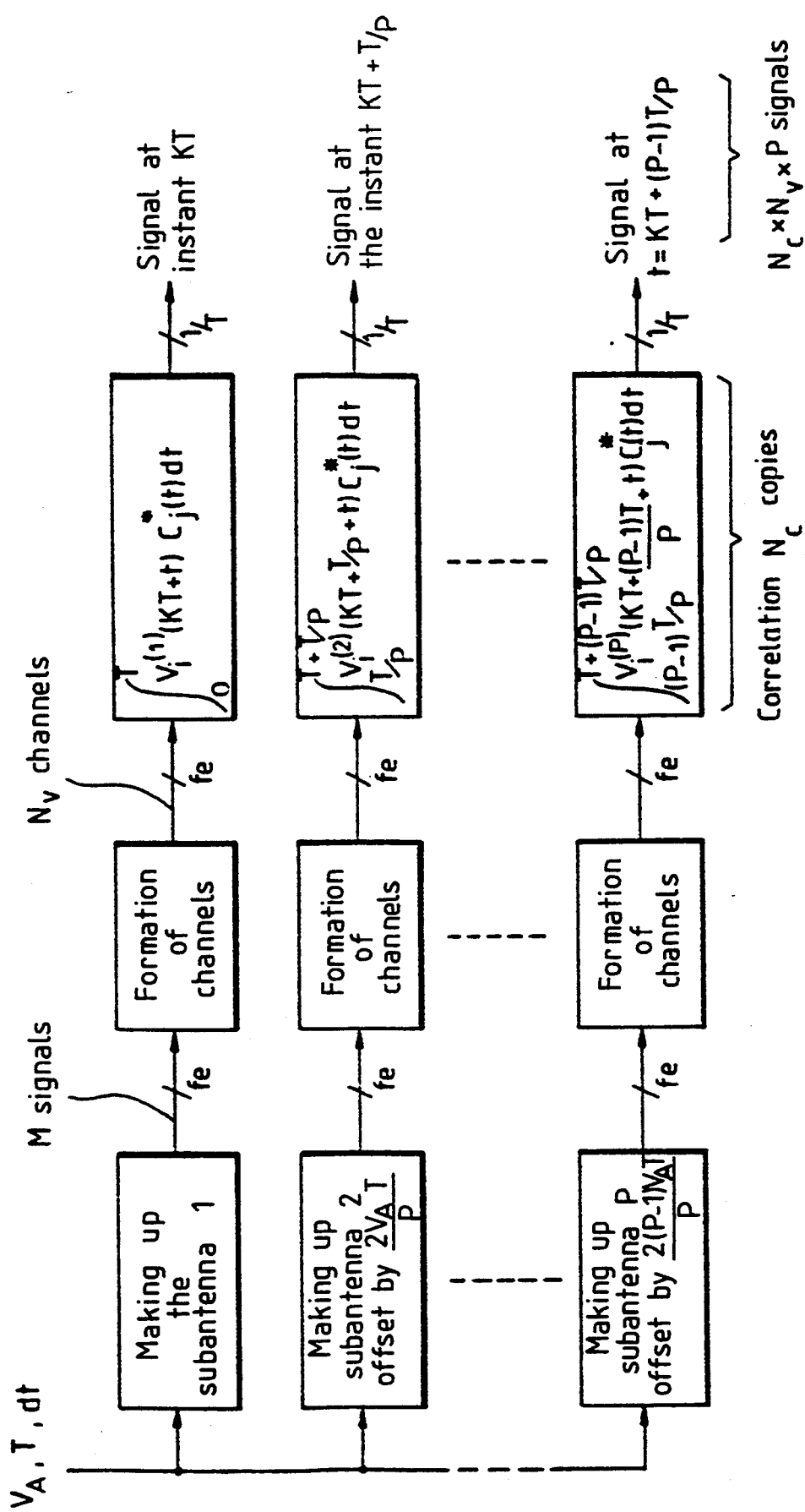
FIG. 6, the block diagram of a device for implementing the invention.

The processing is then carried out according to the block diagram represented in FIG. 6. For P subantennae there are P processing channels each including three steps:

in a first step, the subantenna is made up by choosing the physical or virtual sensors which are necessary to obtain compensation for the Doppler effect:
in a second step, the receiving channels are formed;
in a third step, the correlation of the signals from these channels with the copies of the signals sent out by the transmitter of the sonar is carried out.

The steps of formation of channels and of correlation are entirely conventional. The one corresponding to making up a subantenna of rank k for each synthetic displacement increment of duration dt breaks down into three sub-steps:

in a first step, the position of the M virtual (possibly real) sensors to be used is calculated, taking the relationship:

$$x = 2V_A n\, dt + 2V_A (k-1)\frac{T}{P} + id(o \leq i \leq M - 1) \quad (10)$$

n is the current index which determines the position of the subantenna at every instant on the physical antenna;

in a second sub-step, the $M_i$ physical sensors are selected which correspond to each virtual sensor whose position has been determined in the first substep, as well as the $M_i$ interpolation coefficients to be applied to the signals from these physical sensors in order to obtain the signal from the virtual sensor;

in a third sub-step the M signals from the subantenna k are reconstituted by interpolation.

All this processing is carried out digitally as is the practice nowadays, with sampling of the physical sensors at a frequency fe which is sufficient to be able to form the channels and such that, moreover, fe is higher than 1/dt.

Again taking the figures of the embodiment example given above, for a linear antenna including 200 sensors spaced by 0.2 m and moving at a speed of 10 m/s (20 knots) and with a pulse having a duration of 1 second, each sliding subantenna comprises 88 virtual sensors, each of these sensors being reconstituted from 12 physical sensors. Needless to say, the same physical sensor can be used to reconstitute several virtual sensors.

By way of a variant, and for relatively low interpolation values, it would be possible to use a sufficient number of physical sensors directly. This is particularly advantageous for low transmission frequencies. Thus, in the example described above, if the transmission frequency is taken to be 1000 Hz it is possible to directly use the signals from the physical sensors without interpolation, at the given speed of the boat.

As is well known in the art it is possible, needless to say, to permutate the two steps of formation of channels and of correlation.

The method according to the invention thus makes it possible to compensate for the Doppler effect due to reverberation, without being obliged to resort to an increase in the spatial rejection of the receiving channels, which is always difficult and costly, or even impossible, to obtain. Moreover, since the Doppler shift has been cancelled out, the range of shift for the targets is itself also reduced, which makes it possible to reduce the number of copies used for the correlation.

Finally, it is quite clear that, although the invention has been described in the case of a sonar antenna with relatively point-like transmission and of a towed linear receiving antenna, on which the compensation for the movement is carried out, the invention extends to all the types of sonars in which it is possible to compensate for the movement of the antenna or antennae in this way. In particular, so-called active towed linear antennae are sometimes used, in which the sonar transmitter is situated within these antennae. It is then possible to carry out the compensation within the transmission and even possibly to distribute this compensation between the transmission and the reception.

We claim:

1. A method of compensation for the movement of an antenna for sonar, wherein the antenna includes a set of transducers drawn along in a translational movement, comprising the steps of:

outputting signals from said transducers;

switching said output signals from said transducer in order to obtain a synthetic movement of the antenna whereby a Doppler shift applied to fixed echoes by said translation movement is compensated.

2. The method according to claim 1 wherein the antenna is a towed linear antenna having a set of transducers regularly distributed along said antenna and wherein at least one subset of successive sensors is selected, which said at least one subset is made to slide synthetically in an incremental manner along the antenna in the direction opposite to movement of said antenna.

3. The method according to claim 2, wherein the signals from selected physical sensors are interpolated in order to obtain synthetic sensors interspaced between two successive physical sensors so as to reduce the increment of the synthetic movement in order to reduce the effect of image lobes of an output signal originating from the incremental nature of the movement.

4. A method according to one of claims 2 or 3, wherein several subsets of successive sensors are selected, which said subsets of successive sensors are made to depart successively from the start of the antenna in a staggered, in time, manner in order to cover an entire field of observation of the sonar.

5. A method according to any one of claims 2 or 3 wherein the linear antenna is a receiving antenna for receiving an echo of defined duration and a number of selected transducers is selected so that said selected transducers travel over the whole of the antenna during said duration.

* * * * *